US006311999B1

(12) United States Patent
Kueschall

(10) Patent No.: US 6,311,999 B1
(45) Date of Patent: Nov. 6, 2001

(54) WHEELCHAIR WITH A CLOSED THREE-DIMENSIONAL FRAME

(75) Inventor: Rainer Kueschall, Allschwil (CH)

(73) Assignee: Kueschall Design AG, Allschwil (CH)

(*) Notice: Subject to any disclaimer, the term of this patent is extended or adjusted under 35 U.S.C. 154(b) by 0 days.

(21) Appl. No.: 09/195,046

(22) Filed: Nov. 19, 1998

(30) Foreign Application Priority Data

Dec. 23, 1997 (CH) .................................................. 2953/97

(51) Int. Cl.[7] ....................................................... B62B 7/10
(52) U.S. Cl. .......................................................... 280/250.1
(58) Field of Search ................................ 280/250.1, 291, 280/304.1, 642, 650; 74/607; 301/1, 109, 124.1

(56) References Cited

U.S. PATENT DOCUMENTS

| | | | | |
|---|---|---|---|---|
| 4,650,201 | | 3/1987 | Hartwell . | |
| 4,805,925 | * | 2/1989 | Haury et al. | 280/250.1 |
| 4,989,890 | * | 2/1991 | Lockard et al. | 280/42 |
| 5,060,962 | * | 10/1991 | McWethy | 280/304.1 |
| 5,188,389 | * | 2/1993 | Baechler et al. | 280/650 |
| 5,294,142 | * | 3/1994 | Weege | 280/304.1 |
| 5,333,894 | * | 8/1994 | Mayes | 280/661 |
| 5,509,155 | | 4/1996 | Zigarac et al. . | |
| 5,593,173 | * | 1/1997 | Williamson | 280/642 |
| 5,662,345 | * | 9/1997 | Kiewit | 280/250.1 |
| 5,762,356 | * | 6/1998 | Kunze et al. | 280/304.1 |

FOREIGN PATENT DOCUMENTS

| | | |
|---|---|---|
| 295 15 846 U | 1/1996 | (DE) . |
| 297 05 494 U | 7/1997 | (DE) . |
| 297 04 034 U | 9/1997 | (DE) . |
| 297 11 230 U | 10/1997 | (DE) . |
| 0 255 804 | 10/1988 | (EP) . |
| 2 148 805 | 6/1985 | (GB) . |
| 95 13782 | 5/1995 | (WO) . |
| 98 16182 | 4/1998 | (WO) . |

* cited by examiner

*Primary Examiner*—Brian L. Johnson
*Assistant Examiner*—Tony Winner
(74) *Attorney, Agent, or Firm*—Browdy and Neimark

(57) ABSTRACT

The wheelchair (10) has a closed, three-dimensional frame (12). The latter is constituted by a front horizontal transverse support (12.1), two lateral supports (12.2, 12.3), which are arranged symmetrically in respect to the longitudinal center axis, and a rear, essentially horizontal transverse support (14). The lateral supports have the shape of a letter L with respectively an upright leg (12.2), which laterally adjoins the front transverse support (12.1), and with a rearward oriented longitudinal leg (12.3). A front wheel support (25), on which a front wheel (24) is mounted, is fastened on each upright leg (12.2) of the longitudinal supports.

22 Claims, 21 Drawing Sheets

22

38

102

WHEELCHAIR WITH A CLOSED THREE-DIMENSIONAL FRAME

FIELD OF THE INVENTION

The invention relates to a wheelchair with a closed, three-dimensional frame formed by a front transverse support, two lateral supports, which are arranged symmetrically in respect to the longitudinal center axis, and a rear transverse support, wherein the lateral supports have the shape of a letter L with an upright leg and a longitudinal leg arranged transversely in respect to the latter, wherein the front transverse support is arranged at foot height and the rear transverse support constitutes an axle tube for a pair of rear wheels.

BACKGROUND OF THE INVENTION

Conventional wheelchairs have two pairs of wheels, namely a rear pair of wheels with two large rear wheels, which can be manually driven, and a front pair of wheels, whose shafts can turn in a horizontal plane around a turning point. These wheelchairs are generally foldable and to this end have transverse supports made of two hingedly connected elements, each one of which is hinged on a longitudinal support. Therefore the width of this wheelchair is reduced when it is folded up. The disadvantage of these foldable wheelchairs lies in their lack of rigidity caused by the many hinged connections.

To remedy this disadvantage, it was attempted to produce wheelchairs with rigid and preferably closed frames. For example, a wheelchair of the type described at the outset was described in Swiss Patent Application 1547/97, whose frame is closed and therefore comparatively rigid. This frame consists of a front horizontal transverse support at the height of the feet of the user, a rear horizontal transverse support formed by an axle tube of the pair of rear wheels, and two L-shaped lateral supports, each one of which connects one end of the front transverse support with an end of the rear transverse support, and wherein each lateral support has an upright leg and a longitudinal leg. A front wheel arrangement with a single, centered front wheel, or two front wheels spaced apart from each other, is fastened on the front transverse support. This wheelchair has great rigidity and is easy to turn and maneuver, thanks to the front wheel arrangement which is generally placed in the central area of the front transverse support. It is mainly used as a sport wheel chair. The disadvantage of this wheelchair mainly lies in its poor tilting stability; it is therefore of less use for everyday use and is considered to be unusable by greatly handicapped and older users.

OBJECT AND SUMMARY OF THE INVENTION

It is therefore the object of the invention to improve the wheelchair mentioned at the outset in such a way that, with continued rigidity, it has a great degree of steadiness and therefore an improved lateral tilting stability, so that it can be also used without danger by seriously handicapped and older handicapped persons.

The objects according to the invention are achieved by the provision of a wheelchair with a closed three-dimensional strutless frame, the frame consisting of: a transverse axle tube for a pair of rear wheels, two lateral portions extending forwardly from the axle tube, each the lateral portion being unitary and having the shape of a reverse letter L, the two lateral portions being arranged symmetrically with respect to the longitudinal central axis of the wheelchair, and each L-shaped lateral portion consisting essentially of a generally longitudinally extending upper leg and a generally vertically extending lower leg at the front of the wheelchair, the upper leg having a rear end connected to the axle tube and a front end, and the lower leg having an upper end connected to the front end of the upper leg and a bottom end, a lower transverse horizontal front portion at a height to support a user's feet having two side ends respectively connected to bottom ends of the lower legs of the lateral portions, and front wheel supports, each of which is attached on the lower leg of a respective one of the lateral portions.

The same as the previously known wheelchair, the novel wheelchair has a closed frame, but is considerably more steady and laterally more stable against tilting thanks to the front wheels, which are fastened at a great distance from each other on the front wheel supports.

A further advantage of the novel wheelchair resides in that it provides the option of arranging the front wheel support relatively high above the ground, so that front wheels of relatively large diameter can be used, because of which traveling over uneven ground and overcoming stairs is made easier.

It is possible to attach front wheels of various diameters, depending on the height at which the front wheels are fastened.

Weight savings at the front are achieved by a rigidly welded front wheel suspension, because of which the wheelchair is easier to maneuver.

Depending on the requirements of the user, the front wheel supports can be fastened on the upright legs of the lateral supports in various positions in relation to the longitudinal center plane of the wheelchair. The front wheel supports can extend parallel or obliquely, respectively toward the front or rear, but also laterally transversely in relation to the longitudinal center plane of the wheelchair, wherein each one of these arrangements has certain advantages, but also certain disadvantages. The farther the front wheels extend transversely, the greater the steadiness and lateral tilting stability. Front wheels extending far forward also increase steadiness. But a disadvantage of these arrangements is the reduced ease of turning and the danger that such projecting front wheel supports touch objects in the vicinity of the wheelchair and therefore constitute a hindrance to the movement of the wheelchair. These disadvantages can be avoided when the front wheel supports are oriented parallel in respect to the longitudinal center plane or obliquely in respect to it. With forward oriented front wheel supports, the base generally is larger than with backward oriented front wheel supports, and it is in addition possible to protect the area of the feet of the user from injuries, if the front wheels constitute the farthest forward and possibly the farther lateral portion of the wheelchair. But coupled with this are a reduction in turning ease and greater difficulties in manipulation because of the danger of colliding with the front wheels. With front wheel supports oriented forward and slightly toward the longitudinal center plane, a very large base is still obtained, as well as satisfactory ease of turning, and the collision of the front wheels with the vicinity is prevented, but such front wheels can be unsatisfactory for the arrangement of the footrest. Front wheel supports, which are oriented slightly backward and inward, have proven themselves, so that with a still sufficient steadiness satisfactory turning ease is obtained and front wheel collisions are avoided.

The front wheel supports can also be fastened adjustably in respect to their position in relation to the longitudinal center plane of the wheelchair. However, in this case the fastening should be free of play and should not loosen during use. But the weight of the wheelchair becomes greater because of this and it becomes less easy to turn, because the additional weight is situated at a comparatively large distance from the center of gravity of the wheelchair.

If the front wheels are fastened in a height-adjustable manner on the upright legs of the lateral supports, there is also the option of mounting front wheels of various diameters for the adaptation to changing requirements.

The front transverse support can be produced integrally with the two lateral supports. However, it has been shown to be advantageous to design the front transverse support in such a way that it has a neck on both sides, which extends in the direction of the adjoining upright legs of the lateral support, by means of which it is height-adjustably fastened on this upright leg. height adjustability of the front transverse support is required in particular when a footrest is formed on it. But the footrest can also be fastened to the upright legs of the lateral supports. A footrest integrated in the frame permits a foot position in which the knees of the user are less bent, and therefore the feet are arranged farther toward the front.

The bearings for the rear wheels are situated in the rear wheel hub and are designed in such a way that the rear wheels can be mounted in a known manner by means of plug axles in angle adapter sleeves and are therefore easily removable. In the mounted state, the angle adapter sleeves for the axles of the rear wheels, which are generally designed as plug axles, are oriented transversely in respect to the movement direction and laterally slightly upward, so that the wheels are arranged with a defined camber, as is customary with wheelchairs. In order to exactly set the track parallelism of the rear wheels, the rear transverse support, along with the angle adapter sleeves fastened in it, can be rotated until it takes up a position in which the angle adapter sleeves are correctly aligned. A bubble level can be installed on the rear transverse support for this purpose. The angular wheel camber depends for one on the dimensions of the wheelchair, and for another on the respective purpose of application of the wheelchair, and is therefore preferably adjustable. Angularly fixed angle adapter sleeves, which are pressed into the rear transverse support and which contain the angle adapter sleeves for the axles of the rear wheels, can be respectively exchanged in pairs. However, the installation of a pair of adjustable angle adapter sleeves is more advantageous. By means of such adjustable angle adapter sleeves in accordance with the invention, the camber of the wheels can be changed between 0 and approximately 15.

In recent times wheelchairs have been preferably designed in such a way that they can be used together with a so-called bike. A bike is an arrangement with a front wheel, a drive and a steering device. The wheelchair is coupled to the bike and together with the bike it constitutes a drivable unit. This unit runs on three wheels, namely the wheel of the bike, which constitutes a driving wheel arranged at the front, and the rear wheels of the wheelchair, which constitute running wheels arranged at the rear. When coupling the wheelchair, it is tilted slightly backward, so that its front wheel, or respectively front wheels, no longer have contact with the ground. However, in connection with wheelchairs of conventional design this arrangement has a certain disadvantage, namely the tendency of the wheelchair, and therefore the unit, to tilt backward. To couple a wheelchair with a lifted front wheel, or respectively lifted front wheels, with a bike without there being the danger of tilting back, it is possible to increase the wheel base, i.e. the mutual distance between the front axle of the bike and the pair of rear wheels of the wheelchair. To this end the rear wheels and their fastening are designed in such a way, that the rear wheels can be displaced between a front position, in which they are when using the wheelchair without the bike, and a rear position, in which the wheelchair is less inclined to tilt and is therefore usable with a bike. The increase of the wheel base can be achieved, for example, in that the rear ends of the longitudinal legs have an extension element towards the rear, on which the rear transverse support, or respectively the axle tube, can be fastened in different positions. When using the wheelchair with a bike, the axle tube is then fastened in a rear position instead of in its foremost position. If several fastening locations are provided for the additional longitudinal support, the wheel base can be selectively adjusted within certain limits. When using the wheelchair without the bike, the extension elements arranged underneath the seat surface do not interfere. The wheel base can also be increased for improving the tilt protection without the wheelchair being coupled with a bike, but it is necessary here to accept a worsening of maneuverability.

The seat surface of the wheelchair is located between the longitudinal legs of the lateral supports and can be fastened on these. In a particularly advantageous embodiment, however, the seat surface is fastened at two additional longitudinal seat supports, and the rearward pointing longitudinal legs of the lateral supports are oriented slightly downward. The longitudinal seat supports are fastened on these inclined longitudinal legs in such a way, that they are pivotable at the front around a point of the longitudinal legs and have an adjustable distance from the longitudinal legs at the rear. A seat strut device is arranged for this purpose, which has two seat struts, each one of which is pivotably fastened on a pivot point at the longitudinal leg on one of the longitudinal seat supports and is fastened at a selectable effective seat strut length on the longitudinal leg of the lateral support of the frame. Thus, the longitudinal support, the longitudinal seat support and the seat strut respectively form a triangle in a vertical plane on both sides below the seat. The maximum rear inclination which the seat can assume is determined by the inclination of the longitudinal legs, and the maximum inclination forward and downward which the seat can assume is determined by the length of the seat struts. Although it is possible to use longitudinally adjustable seat struts, possibly with fluid-actuated cylinder/piston devices or with spindles, a simple embodiment in accordance with the invention of the wheelchair is designed in such a way that the seat struts have a plurality of bores over their length. Depending on the seat inclination selected, two screws are inserted through two bores which are at the same distance from the pivot points, by means of which the seat struts are fastened on the associated longitudinal legs. It has been shown to be advantageous for stabilization to arrange the two seat struts parallel by means of a transverse rod arrangement. Preferably several possible fastening points for the longitudinal seat supports are provided in the longitudinal direction at the front end of the longitudinal legs of the transverse supports of the frame.

In a particularly advantageous embodiment of the wheelchair in accordance with the invention, the seat with the two longitudinal seat supports is constituted by a portion of a seat module, which can be removed from the frame.

Usually the seat module comprises, besides the actual seat, a back, wherein preferably only the seat is fastened on the frame of the wheelchair, while the back itself is fastened on the seat, preferably in such a way that the angle between the seat and the back can be adjusted, and best in such a way, that the back can be flipped down on the seat in order to reduce the size of the wheelchair for transport.

In such a seat module, longitudinal seat supports are preferably connected by at least one transverse seat support for increasing stability, and in a particularly suitable embodiment the longitudinal seat supports and a transverse seat support arranged at the back form a U-shaped seat frame, which can be reinforced by a further seat reinforcement support provided in its front area and curved toward the bottom. Since in spite of the mentioned option of flipping the back down, the wheelchair is not a folding wheelchair, which can be folded to reduce its width, the seat surface can be rigid. However, in connection with the present wheelchair of fixed width in accordance with the invention, a flexible material, such as a textile section, on which generally a replaceable seat cushion is placed, is also used for the seating surface. A seat cushion embodied as a wedge-shaped cushion makes it possible to affect the inclination of the seat further.

As already mentioned, the seat module comprises the just described seat and the back, which is fastened on the seat without being directly connected with the frame of the wheelchair. In a preferred embodiment, the back has two lateral, generally tube-shaped back supports, on whose lower ends the longitudinal seat support is fastened by means of angle plates in the rear area. A certain amount of adjustability can be achieved in that different bores are provided for fastening the angle plates, either in the angle plates and/or the longitudinal seat supports and/or in the back supports.

If the back is to be flipped down on the seat for reducing the size of the wheelchair for transporting it, the angle plates are fastened in such a way that they can rotate around their two fastening axes on the longitudinal seat support and on the back support. In order to fix the seat in relation to the back during the use of the wheelchair in spite of this, two lateral fixation plates are provided, which are fixedly attached to the longitudinal seat supports and contain slit-like openings, through which pins of the back support project. When the back is not flipped down on the seat, the fixation plates constitute angle struts between the longitudinal seat supports and the back supports. On their rear ends, the openings have engagement openings for the pins, which extend transversely to the ends and are extended upward, when the back is not flipped down. At their rear ends, the slightly elastic fixation plates are connected by a string. Pulling upward on the string causes the disengagement of the pin from the engagement openings and permits the back to be flipped down on the seat. The fixation plates are fastened by means of screws on the longitudinal seat supports. To permit a selective fastening in various positions, they can contain several adjoining bores for the screws in place of a single bore.

The fixation plates can also be used for fastening lateral protective plates for clothing, which can be screwed to the fixation plates, or for fastening a wheel splash guard. The wheel splash guard is preferably designed in such a way that on the side facing away from the user it has a slightly resilient wheel protection strap, which can be mounted in several positions, so that the wheel splash guard can be placed on the fixation plate or possibly on the protective plate for clothing without the use of tools, so that in the assembled state the fixation plate or the protective plate for the clothing is clamped between the actual splash protection element and the wheel protection strap.

Although for saving weight of the back element, it is possible to omit the transverse support, the two lateral back supports are preferably connected by a transverse support which is bent out toward the back. It can simultaneously be used as a handle for pushing the wheelchair by a third person, and it makes the pull on the just mentioned string easier, when the transverse rod and the string are simultaneously grasped by the same hand.

Removable push handles for pushing the wheelchair can also be fastened on the upper ends of the back supports and they are preferably height-adjustable.

To form a surface for the back, it is possible to provide a rigid material or a textile section in the same way as with the seat. But in order to obtain a back which is adjustable, and therefore can be adapted to the back of the user, it is advantageous to connect the back supports by means of a broad belt or by several narrow, longitudinally adjustable and flexible pairs of belts, something which makes an individual adaptation possible.

The back can furthermore be provided with a back cushion in order to improve the seating comfort. Such a back cushion can have, for example, two connected back cushion elements, which rest in the front and back on the connection of the back supports and which are slipped from above over the connection between the back supports. Differently shaped back cushions, for example with only one back cushion element, are also possible.

So that the back cushion remains in position even when the user is moving, and so that the back cushion does not move out toward the back between the seat surface and the back, a textile back cushion flap can be attached to the front portion of the back cushion and comes to rest between the textile material of the seat surface and the seat cushion.

The back cushion can also have a pocket on its back.

With the novel seat module it is necessary to fasten many textile elements to each other at many places, wherein these fastenings preferably should be releasable and possibly adjustable over small ranges. The seat cushion must be fastened on the seat surface, the two elements of the back cushion must be fastened to each other and/or to the elements connecting the back supports, and respectively two belts of one of the pairs of belts which connect the back supports must be fastened to each other. It has been shown to be advantageous to design all these elements in such a way, that a burr-type tape can be used for fastening.

Further properties and advantages of the invention will be extensively described by means of a preferred embodiment in what follows, making reference to the drawings.

DETAILED DESCRIPTION OF THE PREFERRED EMBODIMENT

Figure 1:
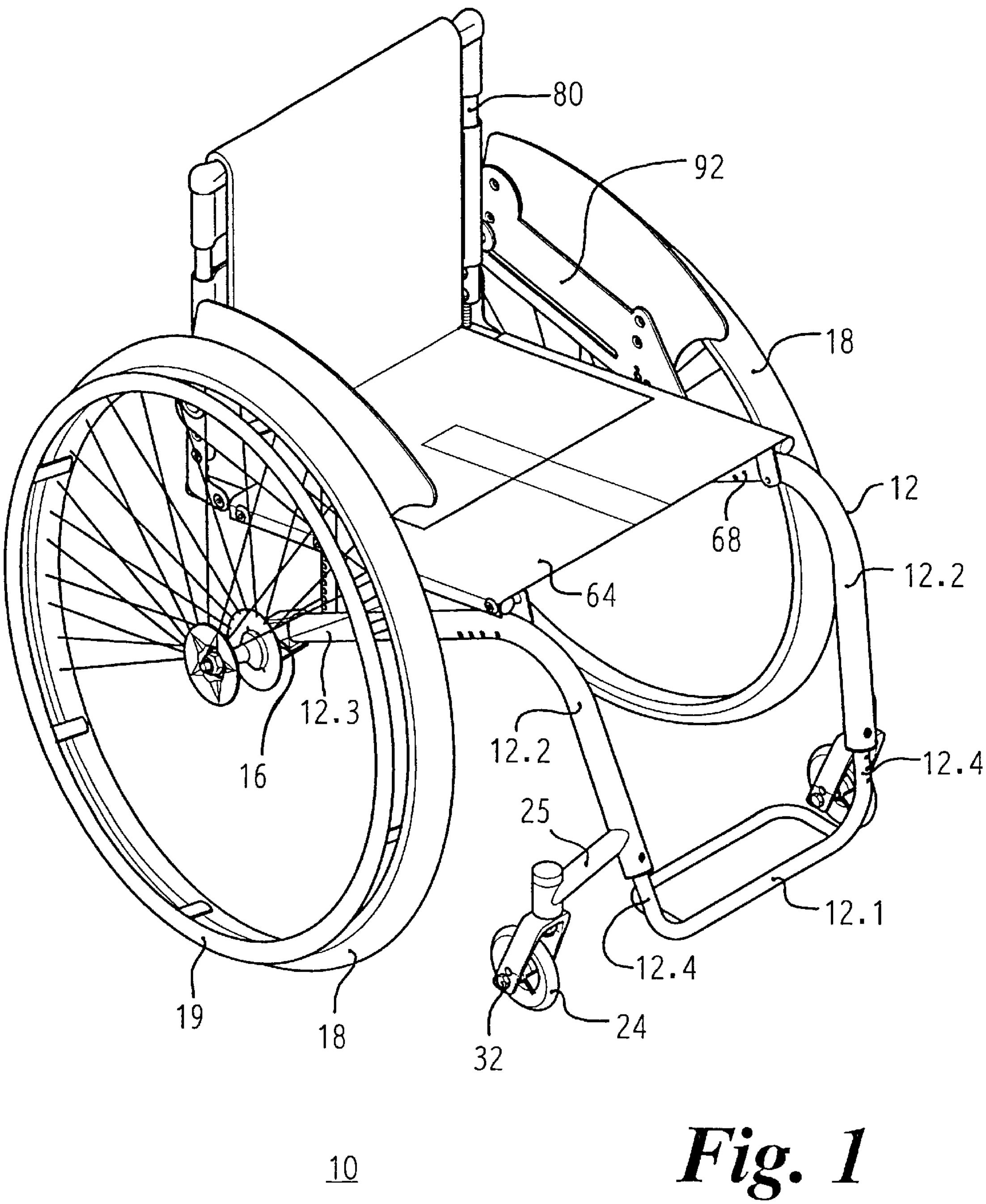
FIG. 1 is a graphic representation of a wheelchair in accordance with the invention.
Figure 2A:
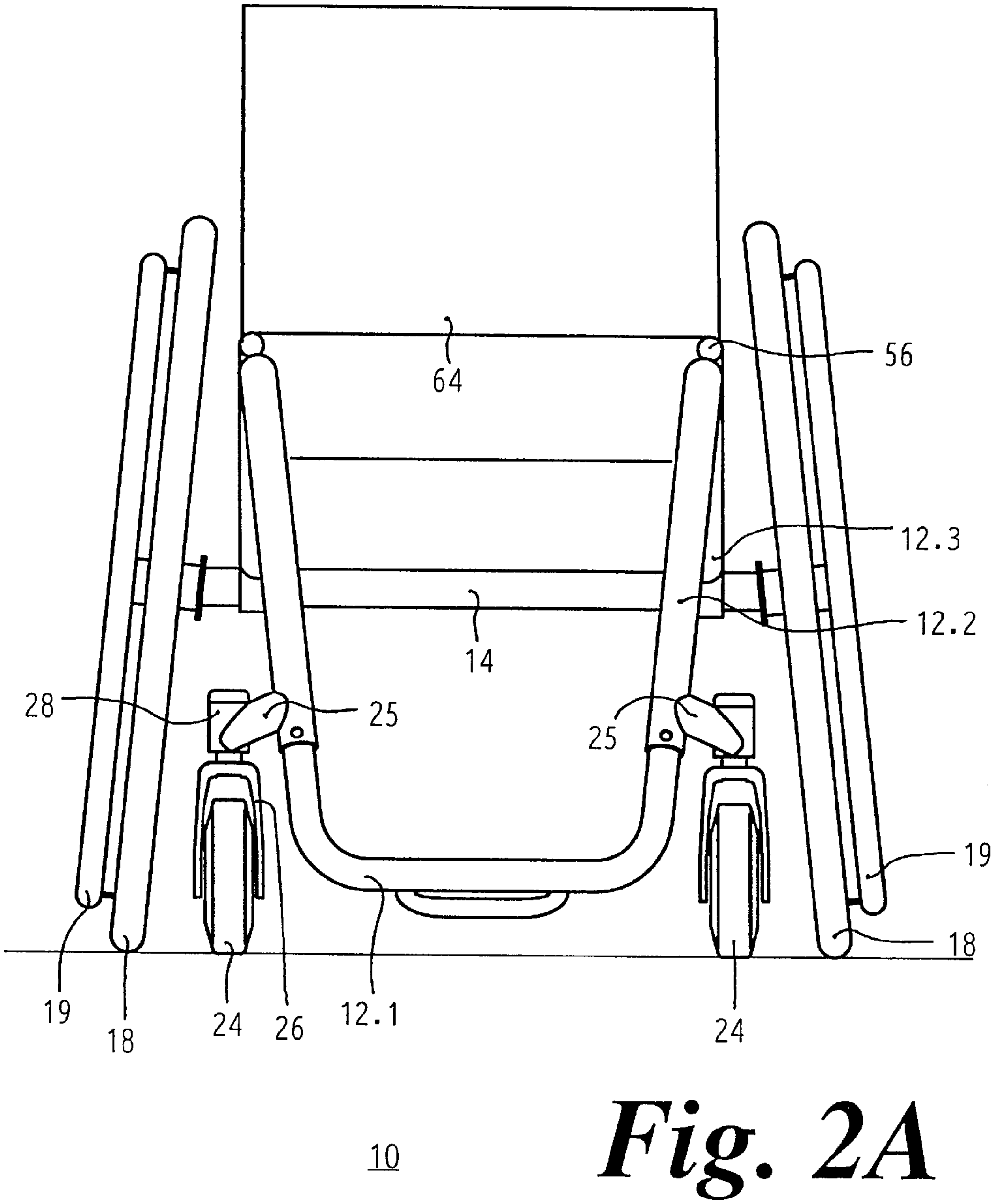
FIG. 2A is a simplified representation from the front of the wheelchair in FIG. 1, but without seat and back cushions.
Figure 2B:
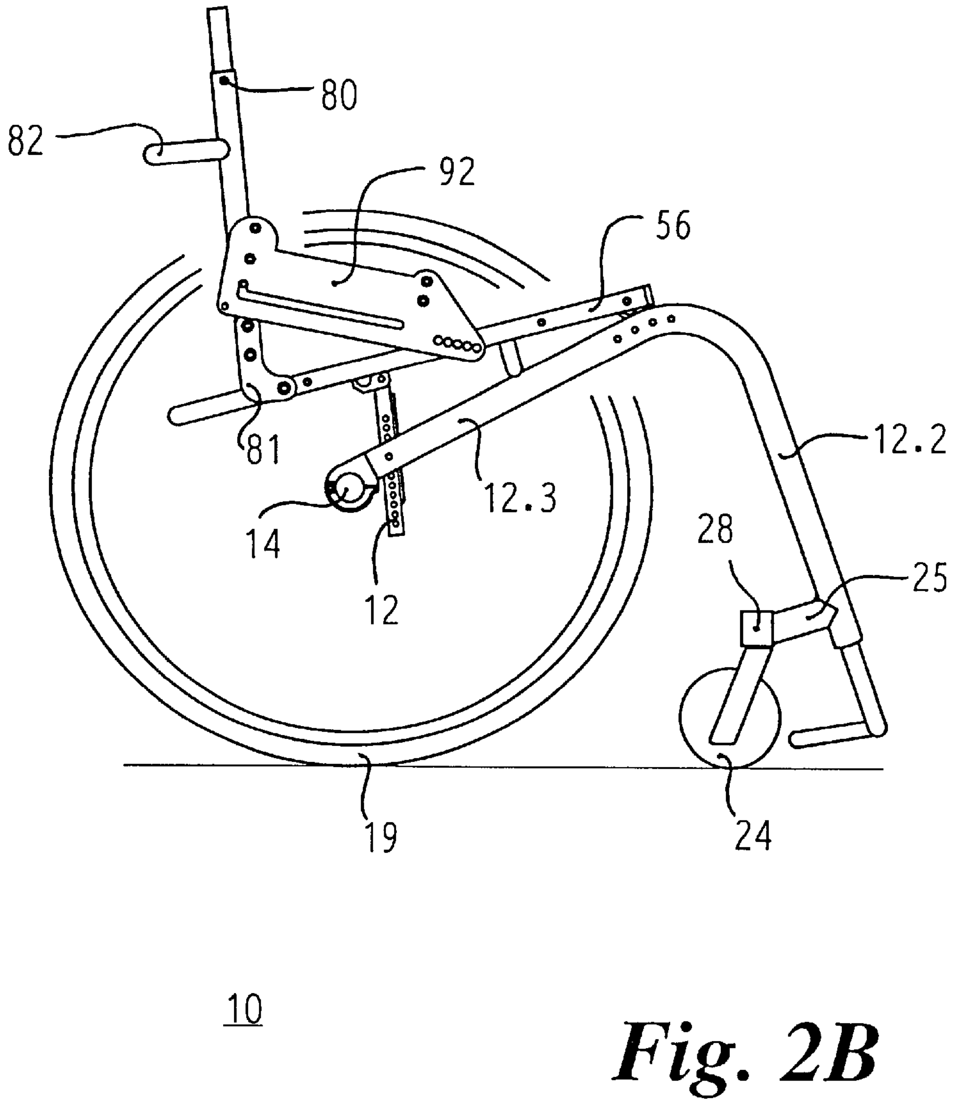
FIG. 2B is a view from the right side of the wheelchair in FIGS. 1 and 2A, also without seat and back cushions.

The wheelchair 10, represented in FIGS. 1, 2A and 2B, has a frame 12, which is formed by a front horizontal transverse support 12.1, two lateral supports 12.2, 12.3, which are arranged symmetrically in relation to its longitudinal center axis, and by a rear transverse support 14, which is essentially horizontal. The lateral supports have the form of a letter L with an upright leg 12.2 and a backward extending longitudinal leg 12.3 adjoining it at the top and approximately at seat height. In general, the upright legs 12.2 are not exactly vertical, but are slightly inclined toward the back and are usually connected by a belt, not represented, at calf height. The front transverse support 12.1 is slightly above the ground, i.e. approximately at the height of the feet of a user. The rear transverse support 14 is constituted by an axle tube for a pair of rear wheels with two wheels 18 of the wheelchair, wherein axle holder devices 16 are used for connecting the axle tube 14 with the rear ends of the longitudinal legs 12.3 of the lateral supports. In general, the lateral supports 12.2, 12.3 and the front transverse support 12.1 are made of a bent tube-shaped material.

The front transverse support 12.1 is bent by approximately 90 on both sides, or has appropriately oriented necks 12.4, which extend in the direction toward the adjoining upright legs 12.2 of the lateral supports and are fastened on these in an adjustable manner. In the present exemplary embodiment the bent ends of the transverse support 12.1 project into these upright legs 12.2, however, a reverse arrangement would also be conceivable, wherein the lower ends of the legs 12.2 would project into the appropriately oriented bent ends 12.4 of the transverse support 12.1.

Figure 3A:
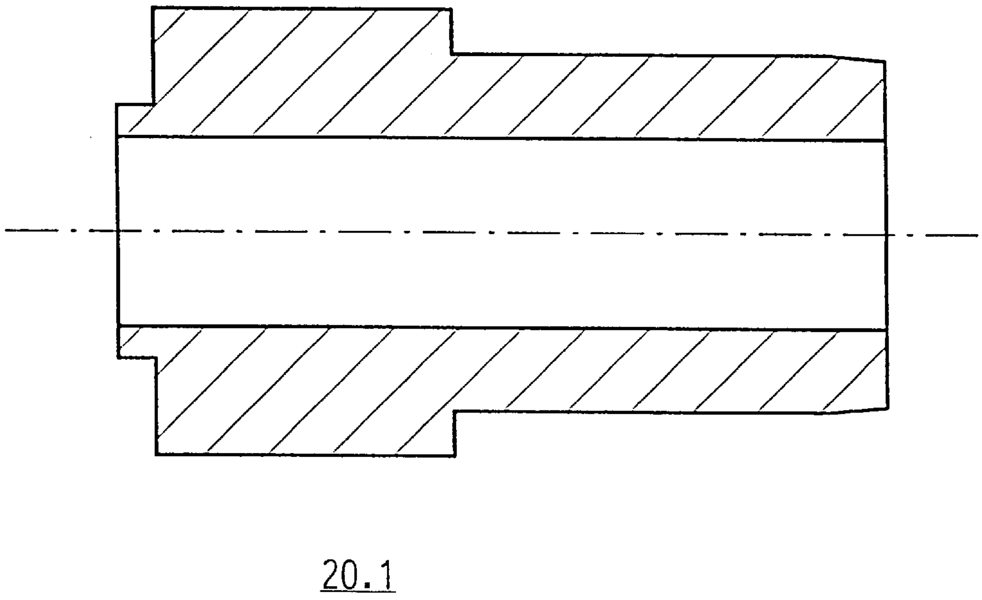
FIG. 3A represents a first fixed angle adapter sleeve in a sectional view along the axis.
Figure 3B:
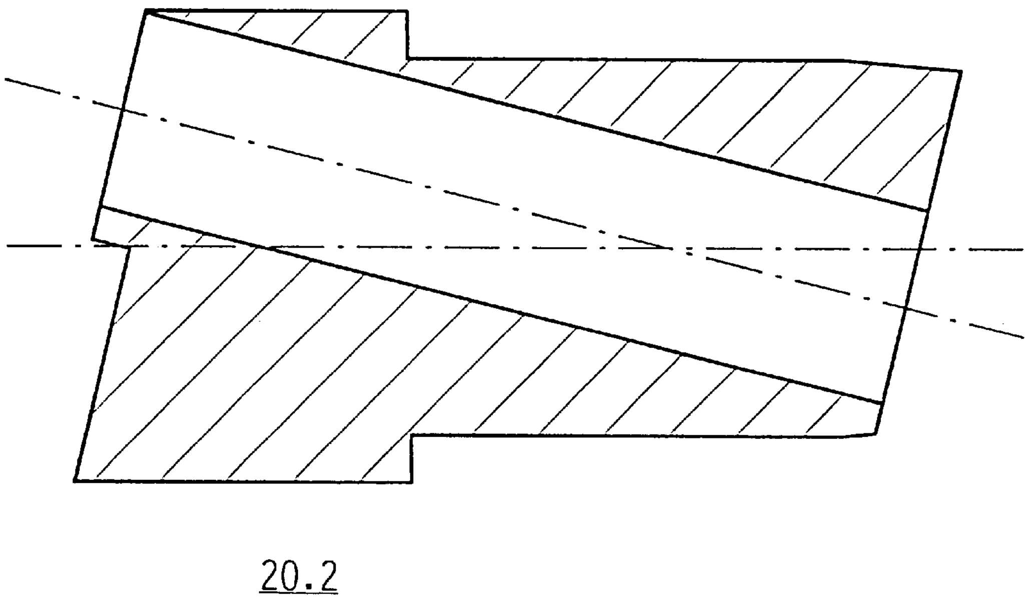
FIG. 3B represents a second fixed angle adapter sleeve in the same representation as in FIG. 3A.
Figure 4A:
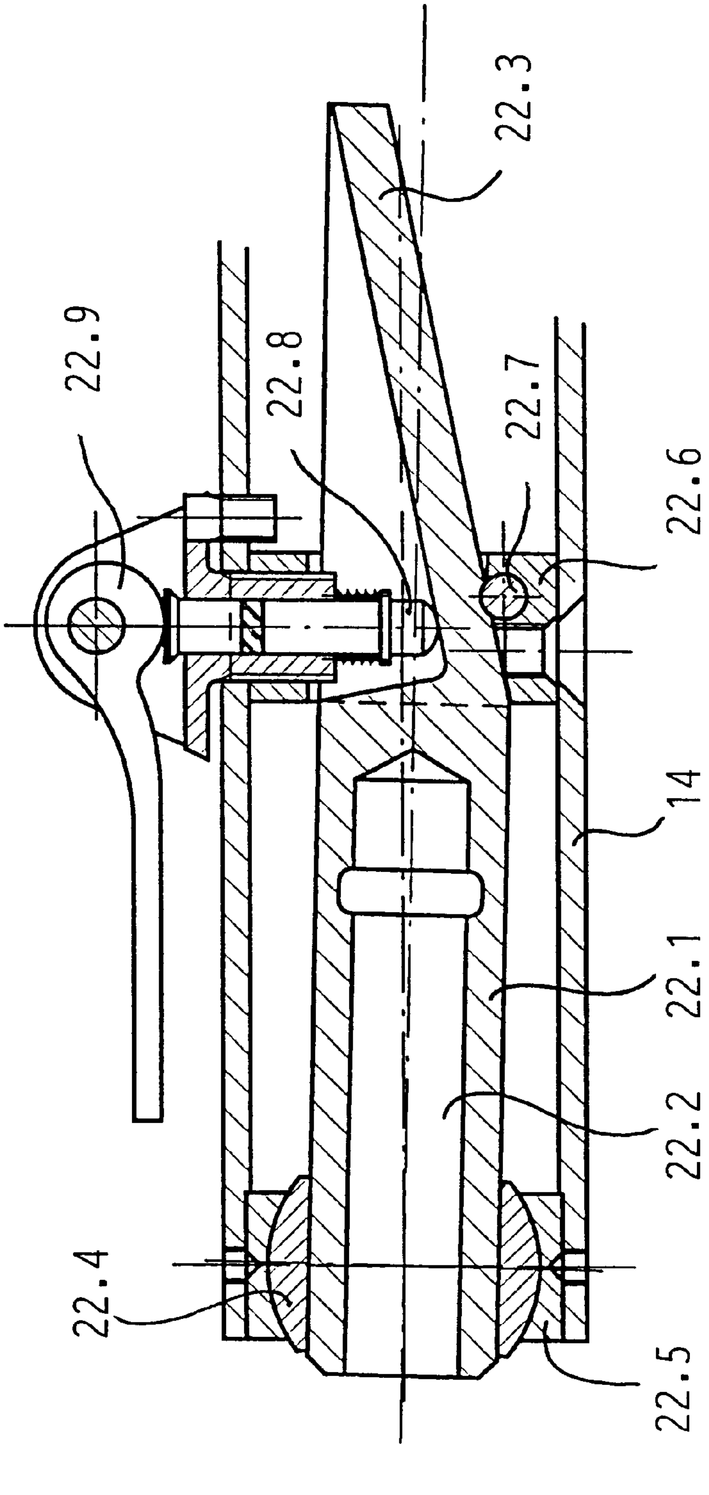
FIG. 4A represents an adjustable angle adapter sleeve in a first position in a sectional view along the axis.
Figure 4B:
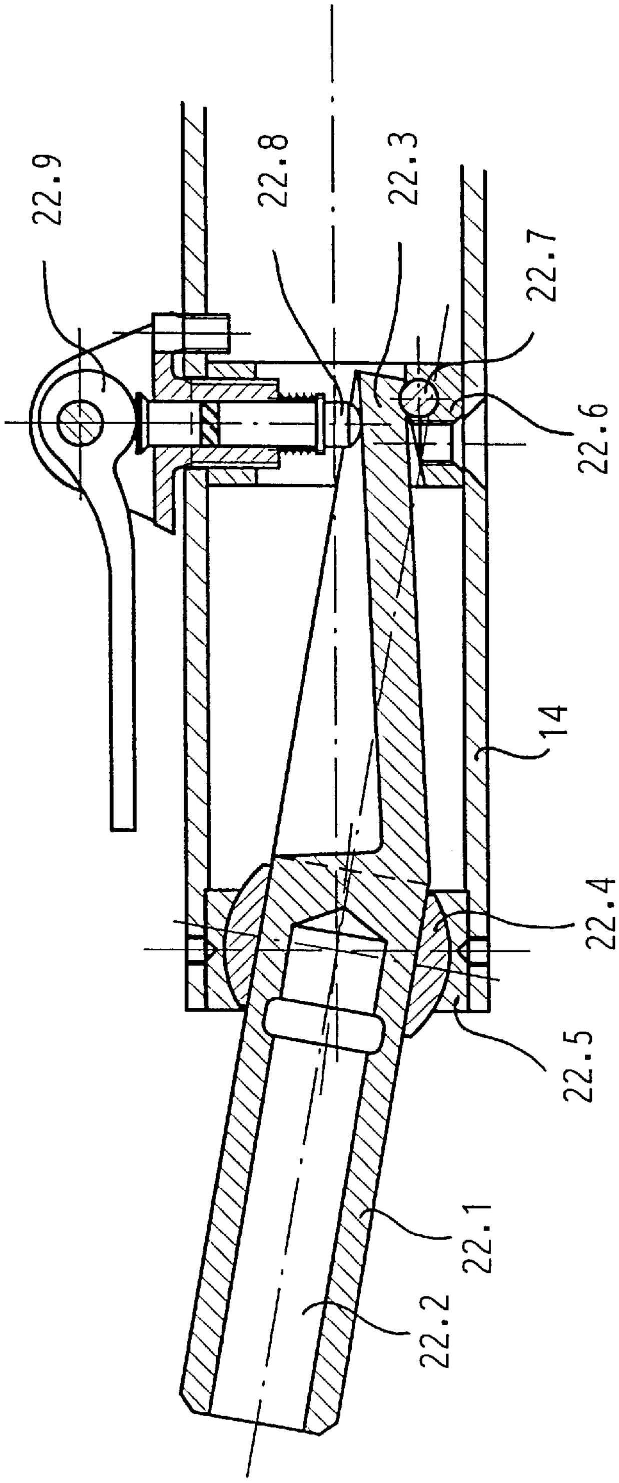
FIG. 4B represents the adjustable angle adapter sleeve in FIG. 4A in a second position and in the same view as in FIG. 4A.

The rear wheels 18 are laterally fastened on the axle tube, or respectively the rear transverse support 14, by means of angle adapter sleeves 20.1, or respectively 20.2, or respectively 22, represented in FIGS. 3A, 3B, 4A, 4B. Each angle adapter sleeve 20.1, or respectively 20.2, or respectively 22, which has been pressed with a part of its length into one of the open ends of the rear transverse support 14 and projects with its remaining length out of the rear transverse support 14, constitutes a bearing for a plug axle, not represented, which has been inserted into it and with which a rear wheel 18 is fastened. To change the wheel camber, it is necessary either to exchange the angle adapter sleeve 20.1 in accordance with FIG. 3A, made for a defined wheel camber, for an angle adapter sleeve 20.2 in accordance with FIG. 3B, made for a different wheel camber, or an adjustable angle adapter sleeve 22 in accordance with FIG. 4A and FIG. 4B is used.

The angle adapter sleeve represented in FIG. 3A provides a minimum wheel camber of 0, and the angle adapter sleeve represented in FIG. 38 provides a wheel camber in the range of approximately 15, which corresponds approximately to the maximum value in connection with this construction.

FIGS. 4A and 4B show the same adjustable angle adapter sleeve 22 in two different settings, wherein the wheel camber with a setting in accordance with FIG. 4A is approximately 1, and is approximately 10 with a setting in accordance with FIG. 4B. The angle adapter sleeve 22 has a cylindrical element 22.1 with a seating bore 22.2 and with an asymmetric neck 22.3, obliquely oriented towards the axis of the seating bore 22.2. The cylindrical element 22.1 extends through a seating cylinder 22.4, which is rotatably seated via an axle tube insertion piece 22.5 in the rear transverse support, or respectively the axle tube 14. The asymmetric neck 22.3 is supported via a further axle tube insertion piece 22.5 and a transverse shaft 22.7 in the rear transverse support, or respectively the axle tube 14. In the assembled position a plunger 22.8, which can be actuated by means of an eccentric lever 22.9, pushes the asymmetric neck 22.3 downward against the force of a spring. By means of pivoting the eccentric lever 22.9, the plunger 22.8 moves away under the force of the spring from the eccentric neck 22.3, so that the angle adapter sleeve 22 can be brought into a different position, in which it is again fixed in place in this new position by another turn of the eccentric lever 22.9.

So that the tracks of the rear wheels 18 run parallel with the travel direction, or respectively the longitudinal center plane of the wheel chair 10, it is necessary to set the rear transverse support 14, or respectively the axle tube with the pressed-in angle adapter sleeves 20.1, 20.2, or respectively 22, in such a way that the bearings, and with them the plug axles, not represented, of the rear wheels 18, which must be oriented slightly upward toward the exterior in accordance with the desired wheel camber, are exactly located in a transverse plane in respect to the longitudinal center plane of the wheelchair 10. A bubble level, not represented, has been installed on the rear transverse support 14 for setting the angle adapter sleeves, or respectively the rear transverse support.

The rear wheels 18 can be manually propelled in the customary manner by means of grip rings 19 which are fastened on them and are concentric with them.

Two non-driven front wheels 24 of a pair of front wheels have been rotatably mounted on front wheel supports 25, which are fastened on the upright legs 12.2 of the lateral supports. As is customary, the diameter of the front wheels 24 is considerably less than the diameter of the rear wheels 18, but with front wheel supports 25 arranged sufficiently high, the front wheels 24 can have a comparatively large diameter. Each front wheel 24 is seated in a fork 26. On its upper end, the fork 26 has a vertical pivot, which is rotatably received in a pivot bearing 28, which is fastened via the front wheel support 25 on the upright leg 12.2. The front wheel support 25 is oriented backwards and toward the longitudinal center plane of the wheelchair 10. The two ends of the fork 26 have pairs of bores 33 at two or more levels for receiving a front wheel axle 32, so that the front wheel 24 can be installed at various heights, by means of which the inclination of the entire wheelchair 10 can be changed. A further option for changing the inclination of the entire wheelchair 10 is provided by the installation of smaller or larger front wheels 24.

Figure 5:
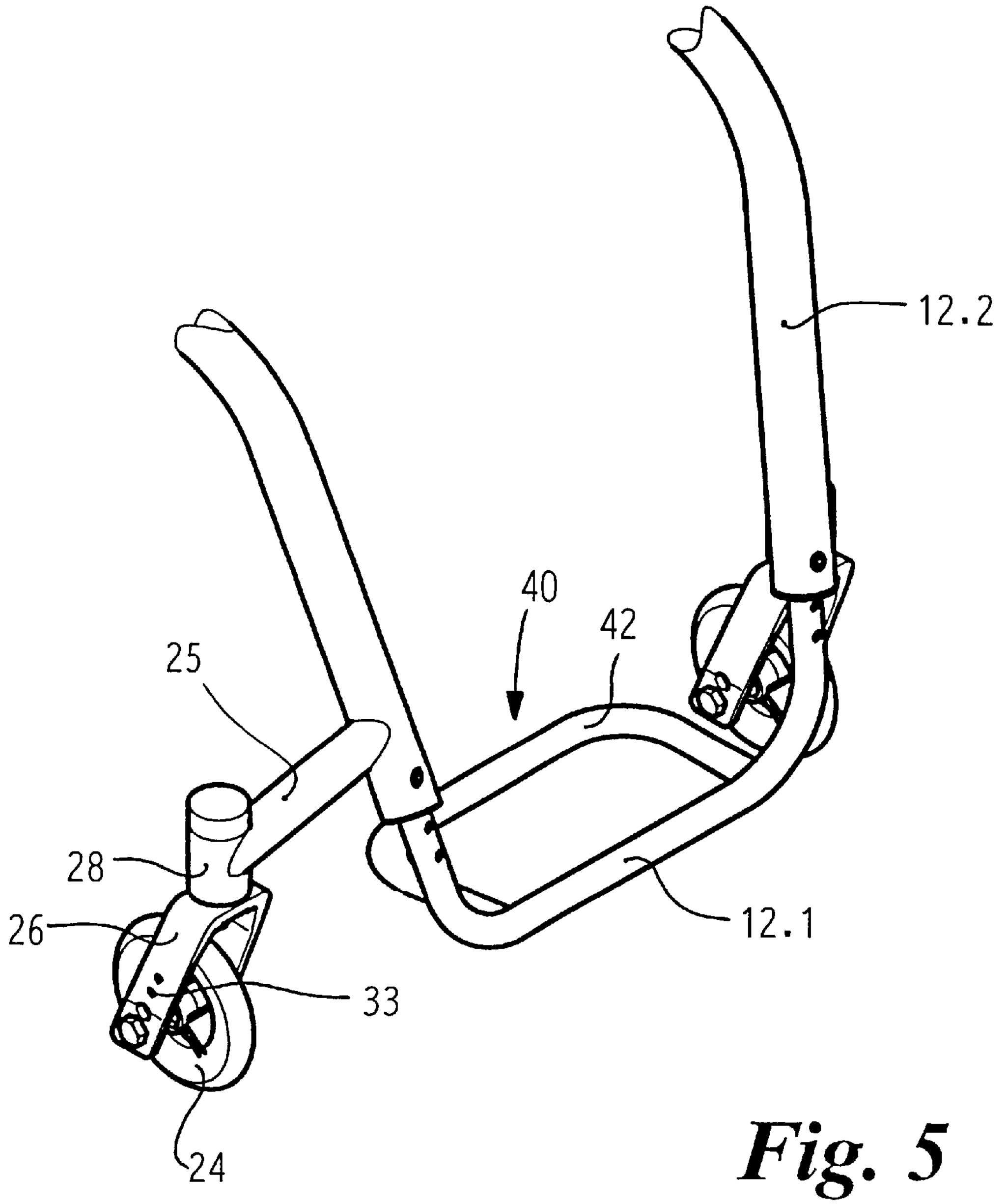
FIG. 5 is a graphic representation of a first embodiment of a footrest.

FIG. 5 represents a footrest 40, which essentially consists of a bow 42, fastened on the front transverse support 12.1 for supporting the feet of the user. The height of the footrest 40 can be adjusted by means of the height adjustability of the transverse support 12.1 in relation to the upright legs 12.2 of the lateral supports.

Figure 6:
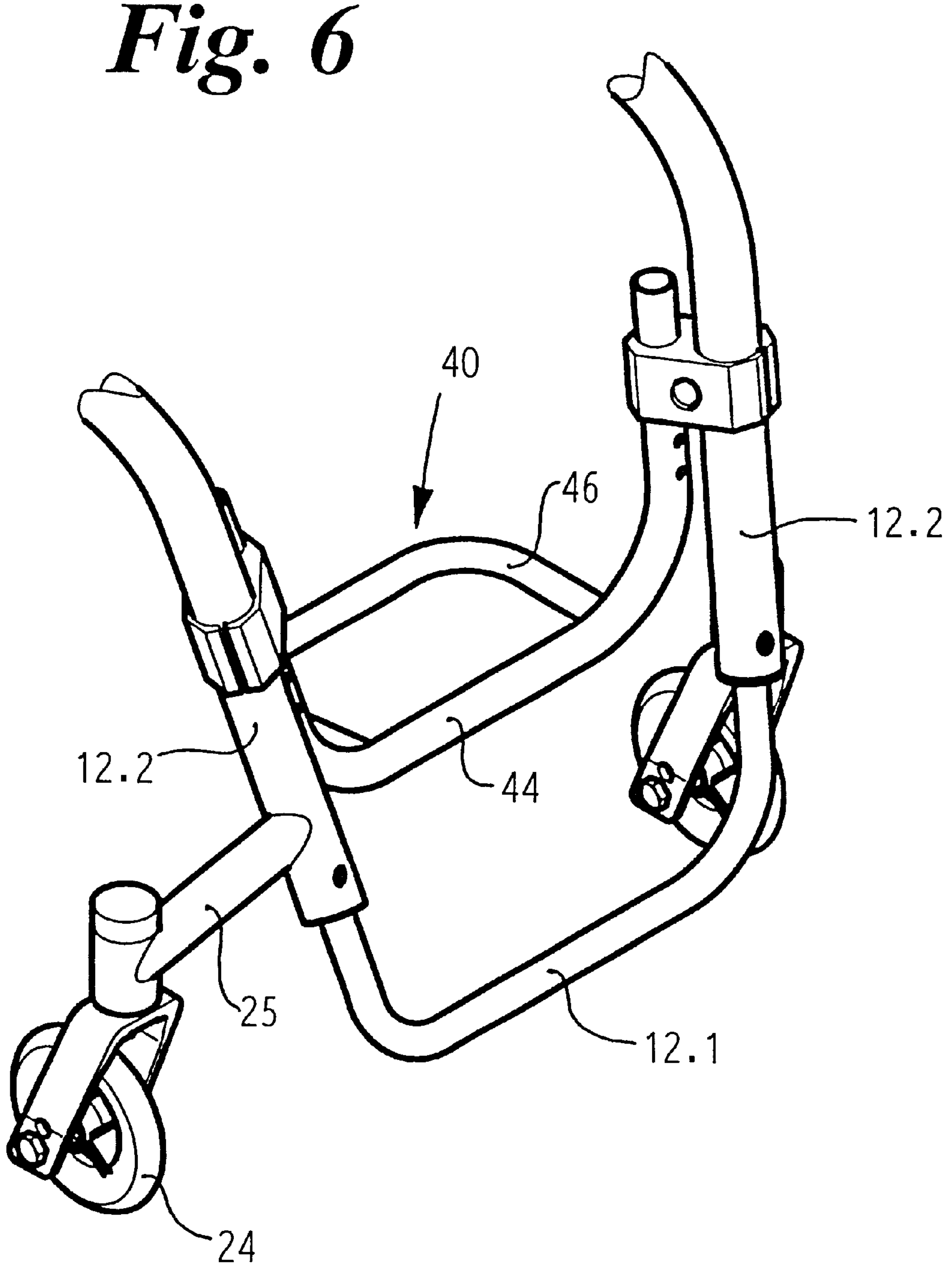
FIG. 6 is a graphic representation of a second embodiment of a footrest.

FIG. 6 represents a differently embodied footrest 40, which is constituted by a U-shaped element 44 with a bow-like attachment 46, which is height-adjustably fastened on the upright elements of the lateral legs 12.2 of the lateral supports.

Figure 7:
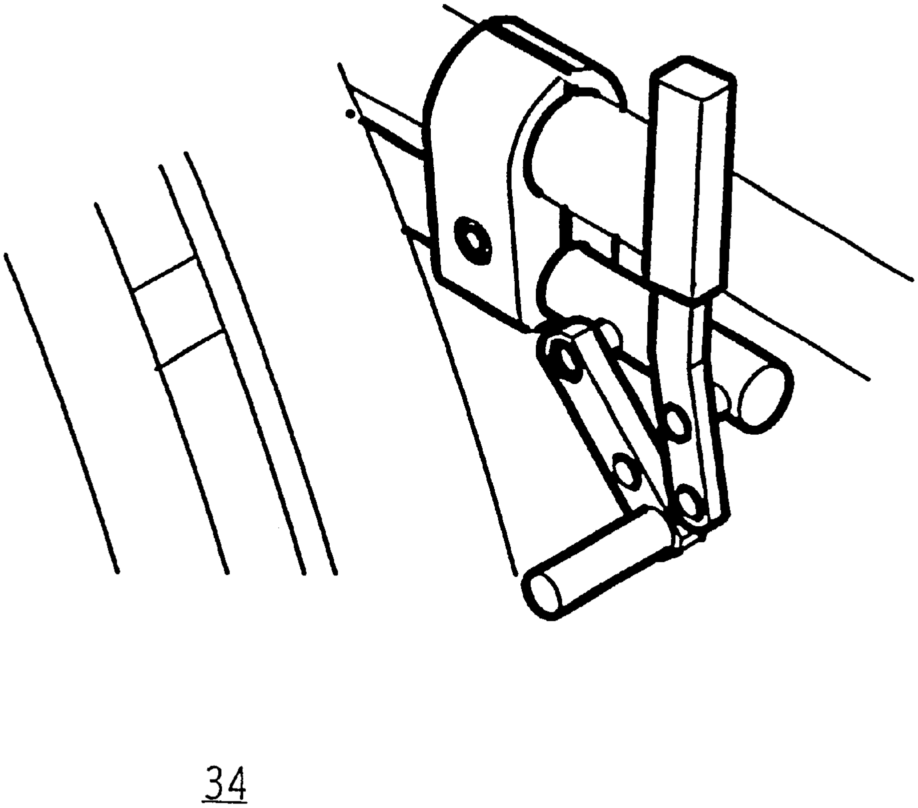
FIG. 7 is a graphic representation of a first embodiment of a brake unit.
Figure 8:
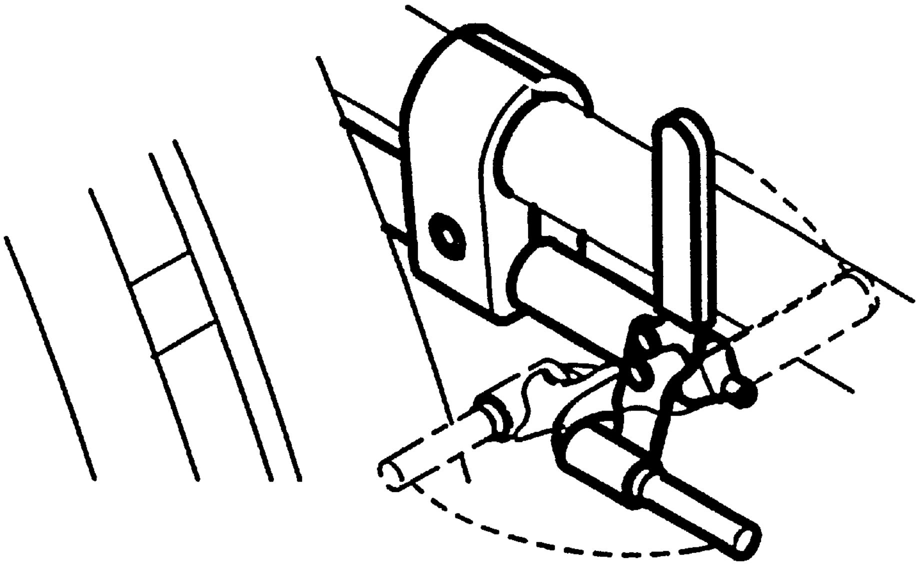
FIG. 8 is a graphic representation of a second embodiment of a brake unit.
Figure 9:
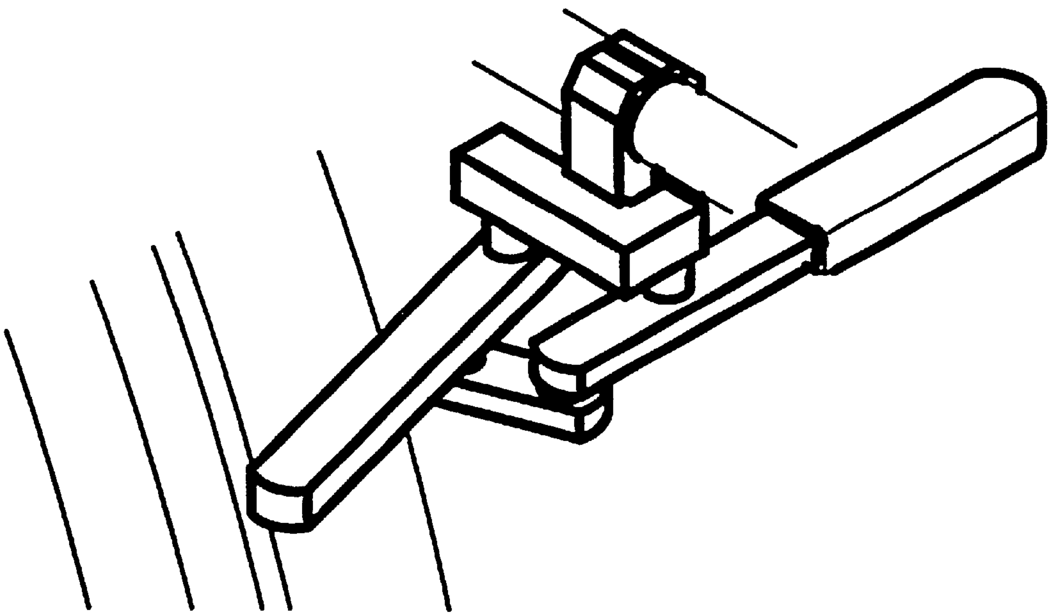
FIG. 9 is a graphic representation of a third embodiment of a brake unit.

The wheelchair 10 furthermore has a brake device formed by two brake units 34. The brake units are diametrically opposed and fastened mirror-symmetrically on the front area of the longitudinal supports 12.3. FIGS. 7 to 9 show three different embodiments, known per se, of a brake unit 34, or respectively 36, or respectively 38, which do not require any further explanations.

Figure 10:
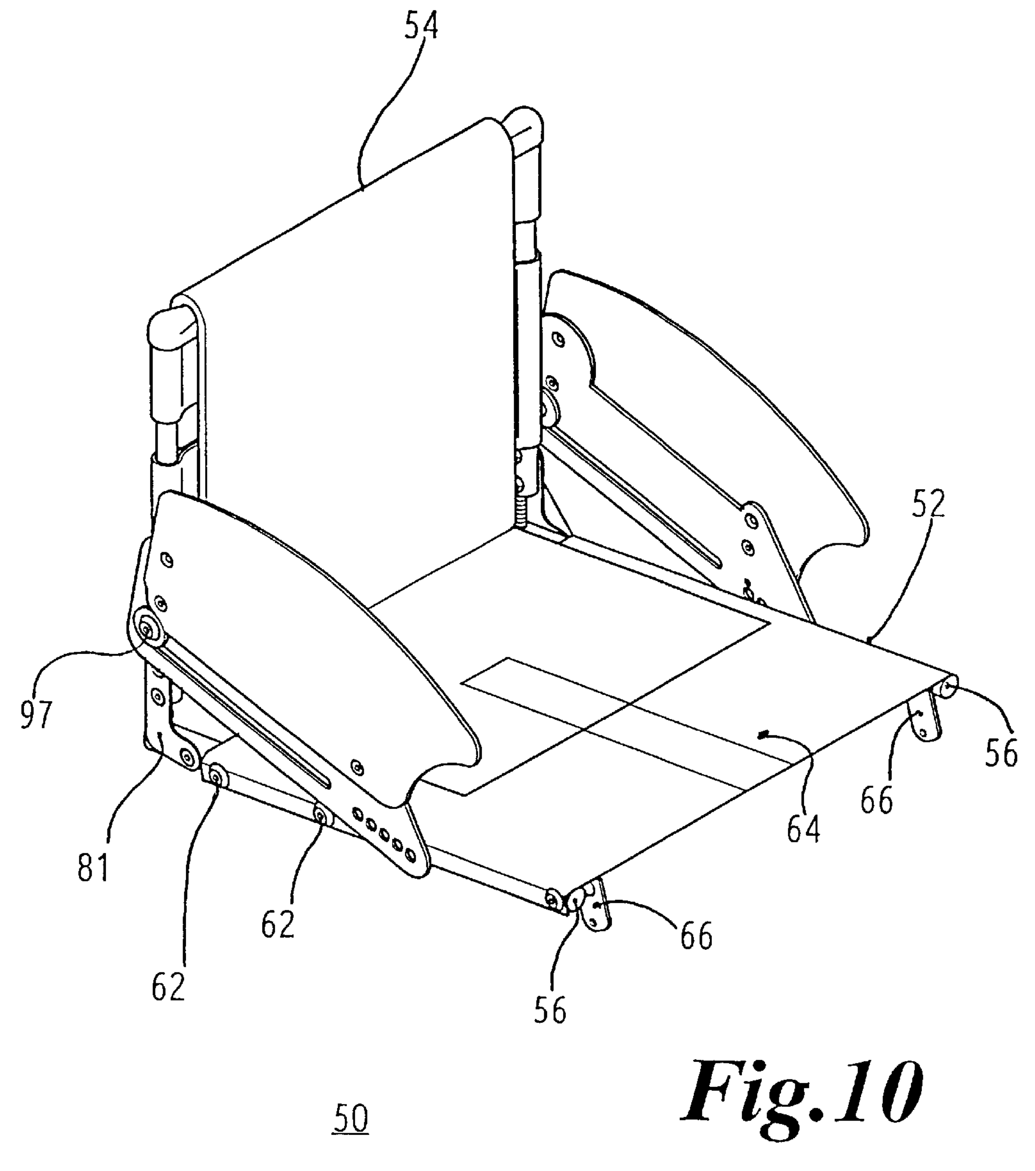
FIG. 10 is a graphic representation of a seat module of the wheelchair, but without the seat and back cushions.

A seat module 50 is represented in FIG. 10. This seat module 50 essentially consists of a seat 52 and a back 54.

Figure 13:
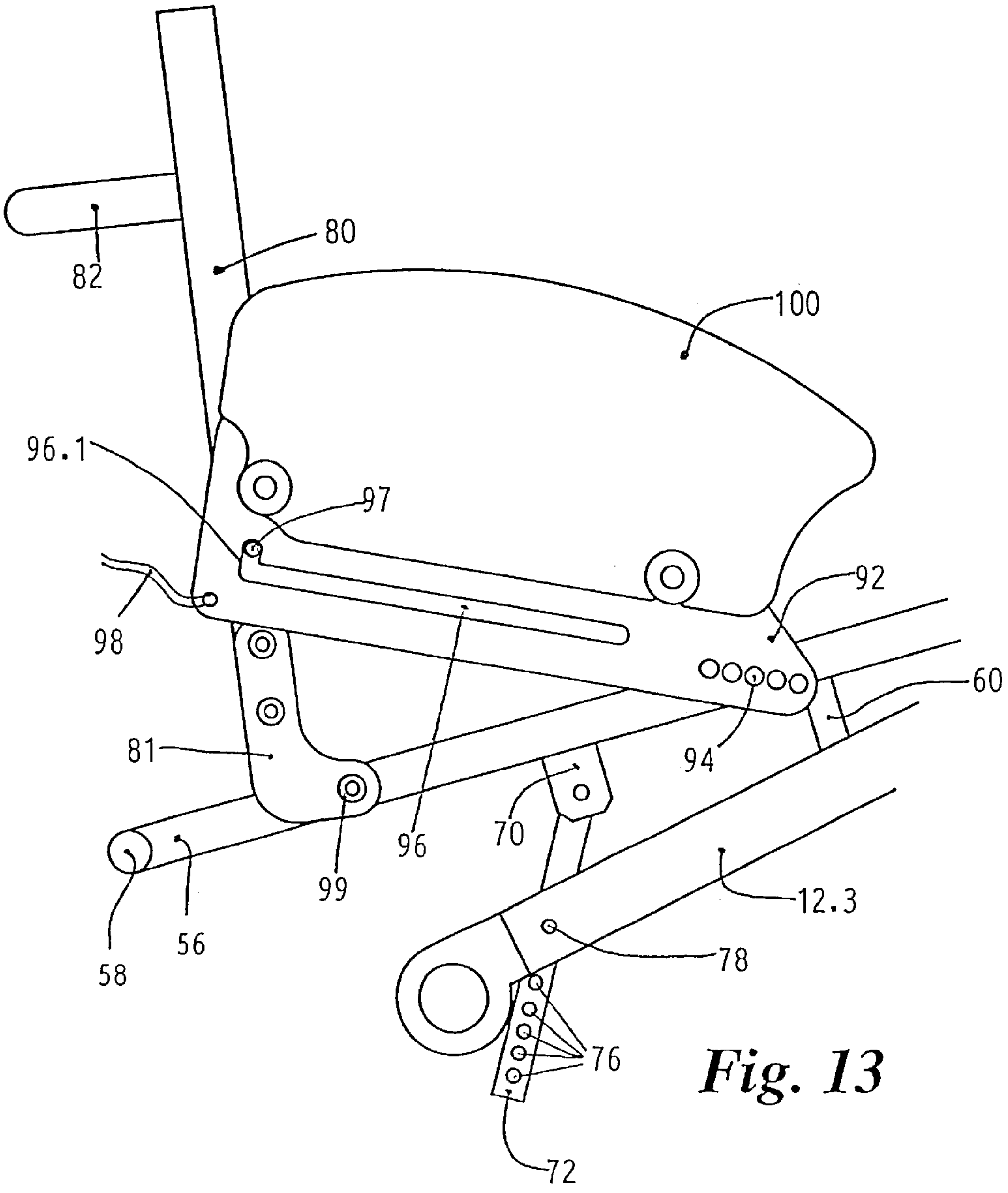
FIG. 13 is a graphic representation of the area of a fixation plate with a protective plate for clothing.

The seat 52 has two parallel longitudinal seat supports 56 which, together with a rear lateral seat support 53, which is visible in FIG. 13, form a U-shaped seat frame made from an appropriately bent tube and reinforced by a further lateral seat support 60, which is curved downward and partially visible in FIG. 13. A section of a textile material is fastened by means of several screws 62 between the longitudinal seat supports 56 and essentially constitutes the seating surface 64, on which a cushion, not represented, is arranged.

On its front end, each longitudinal seat support 56 has a neck with a fastening flap 66 containing a bore provided for receiving a screw, by means of which the front end of the longitudinal seat support 56 is fastened in one of several bores 68, visible in FIG. 1, at the front end of the longitudinal legs 12.3 of the lateral support of the wheelchair 10.

As can best be seen in FIG. 13, respectively one further, downward directed neck, or respectively fastening flap 70, is provided on the two longitudinal seat supports 56 in the rear area of the actual seat surface 64. These fastening flaps 70 are used for hingeing of respectively one seat strut 72. The two seat struts 72 form a pair of seat struts and are placed parallel with each other by means of a transverse rod arrangement, not represented, which connects them. Each seat strut 72 has a plurality of bores 76, which are provided for receiving a screw, not represented, by means of which the seat struts 72 are fastened on the rear end of the associated longitudinal legs 12.3 of the lateral support. The effective length of the seat struts 72, and therefore the angle of inclination of the seat surface is determined by the appropriate selection of the bore 76 for the said screw, wherein the maximum inclination of the seat surface 64 is slightly less than the inclination of the longitudinal legs 12.3 of the lateral supports.

The back 54 has two lateral back supports 80, which are fastened by means of angle plates 81 on the longitudinal seat supports 56, wherein the angle between the back 54 and the seat surface 64 is adjustable. The two back supports 80 are connected with each other by means of a transverse rod 82, which is curved toward the back. In accordance with FIG. 11, pairs 84 of belts extend between the back supports at several levels, whose length is adjustable and which are partially provided with a burr-type tape 85.

Furthermore, the back 54 has a back cushion 86 with a rear cushion element 86.1, a front cushion element 86.2 and a back cushion flap 86.3 fastened at the bottom end of the front cushion element 86.2, which in the assembled state lies between the seat surface 64 and the seat cushion. Like the pairs 84 of belts, the back cushion 86 is also appropriately provided with a burr-type tape 85.

Figure 11:
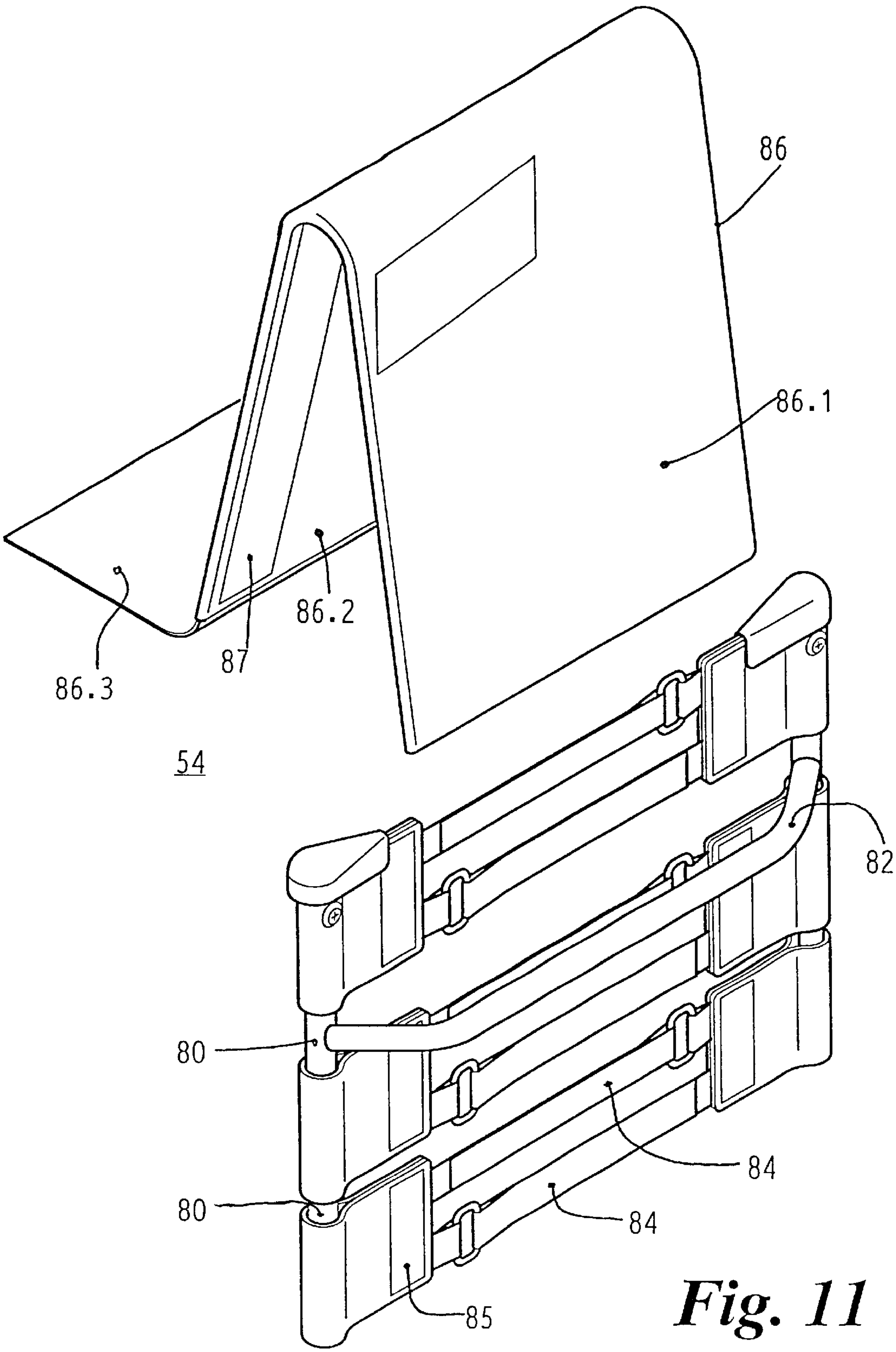
FIG. 11 is a graphic representation of a back with a back element and a back cushion for the seat module in FIG. 10.
Figure 12A:
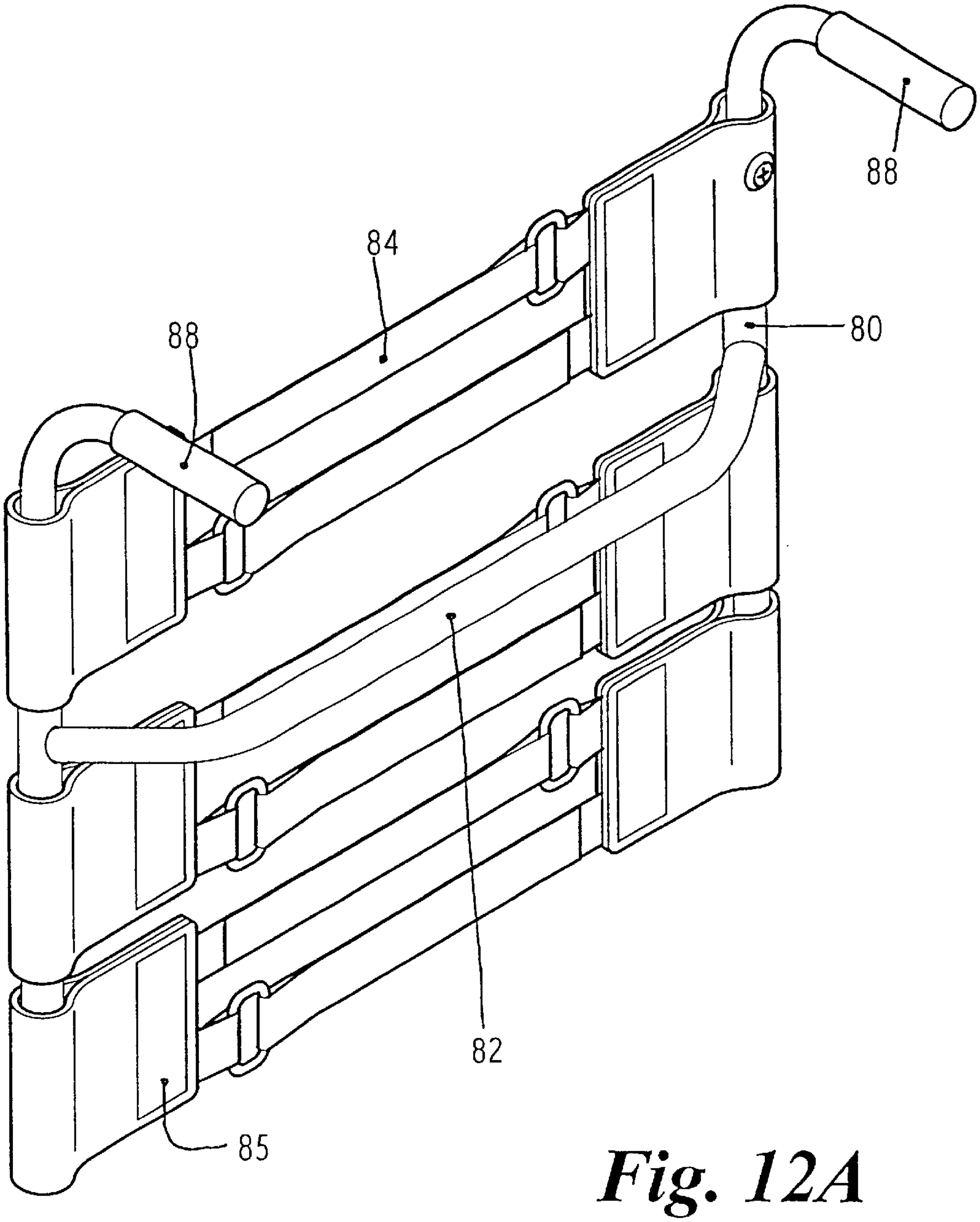
FIG. 12A is a partial graphic representation of a back element with push handles of a first type.
Figure 12B:
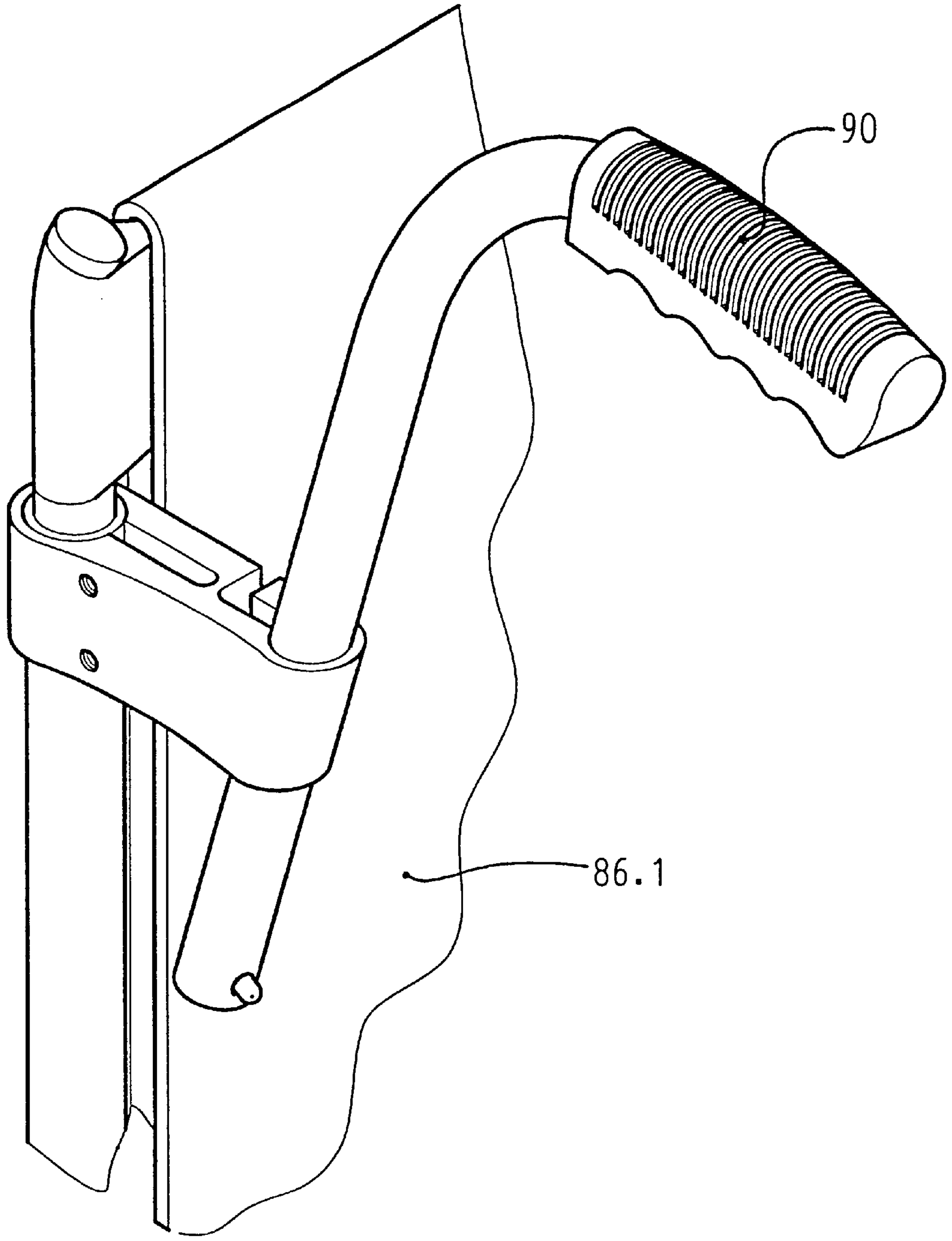
FIG. 12B is a partial graphic representation of a back element with push handles of a second type.

Either the transverse rod 82 in accordance with FIG. 11, or the handles 88 in accordance with FIG. 12A, or height-adjustable handles 90 in accordance with FIG. 12B are used for pushing the wheelchair 10.

Again referring to FIG. 13, a description of what constructive steps have been employed in connection with the seat module 50 to make possible the flipping down of the back 54 onto the seat 52 will now be provided. A fixation plate 92 is pivotably fastened with its front end at 94 on the longitudinal seat support 56, wherein several bores permit mounting in various positions, which determine the relative inclination of the back 54 in relation to the seat surface 64. The fixation plate 92 furthermore has a slit-shaped opening 96, into which a pin 97 fastened on the back support 80 extends. At its back end, the opening 96 is widened toward the top and constitutes an engagement opening 96.1 for the pin 97 when the back 54 is flipped up. In order to flip the back 54 down, an upward pull is exerted on a string 98, which connects the back ends of the fixation plate 92. By means of this the pin 97 becomes disengaged from the engagement opening 96.1 and the back 54 can be forwardly inclined, while the pin 97 is displaced in the opening 96. The screw 99 connecting the back 54 with the longitudinal seat support 56 is not tightened, but is used as a pivot shaft during the flipping motion of the back 54.

Figure 14:
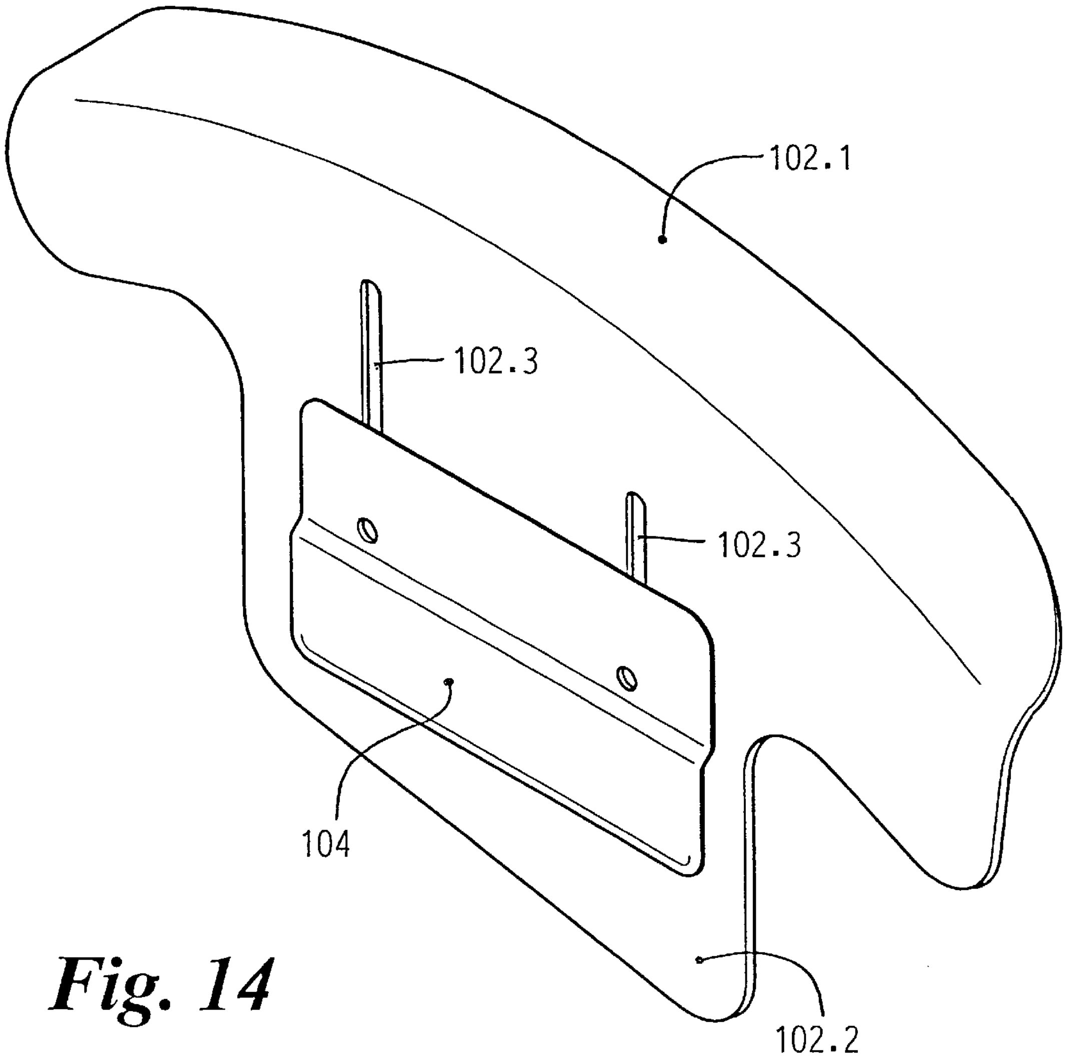
FIG. 14 is a graphic representation of a a wheel splash guard.

The fixation plate 92 is also used as a mounting plate for a screwed-on protective plate 100 for clothing in accordance with FIG. 13, or a wheel splash guard 102, which can be placed on it and is represented in FIG. 14. The wheel splash guard 102 has an element 102.1, bent toward the wheel, and a vertical element 102.2. A slip-on strap 104 is screwed to the latter, wherein slits 102.3, instead of bores, are provided on the vertical portion for screws, not represented. Because of this the slip-on strap 104 can be screwed in place at different locations, so that the wheel splash guard 102 can take up different positions in relation to the fixation plate 92.

Figure 15:
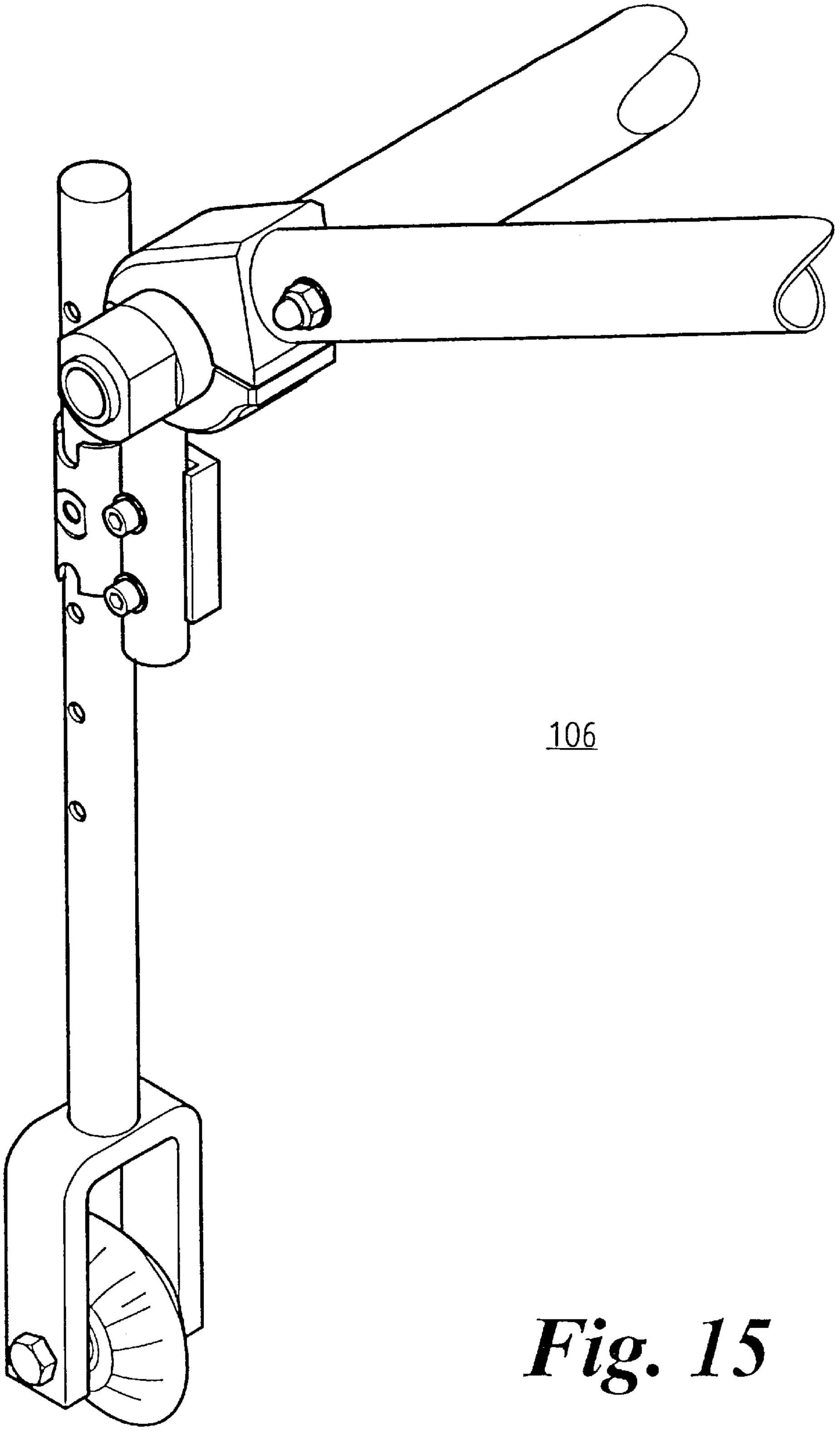
FIG. 15 is a graphic representation of a transit roller device.
Figure 16:
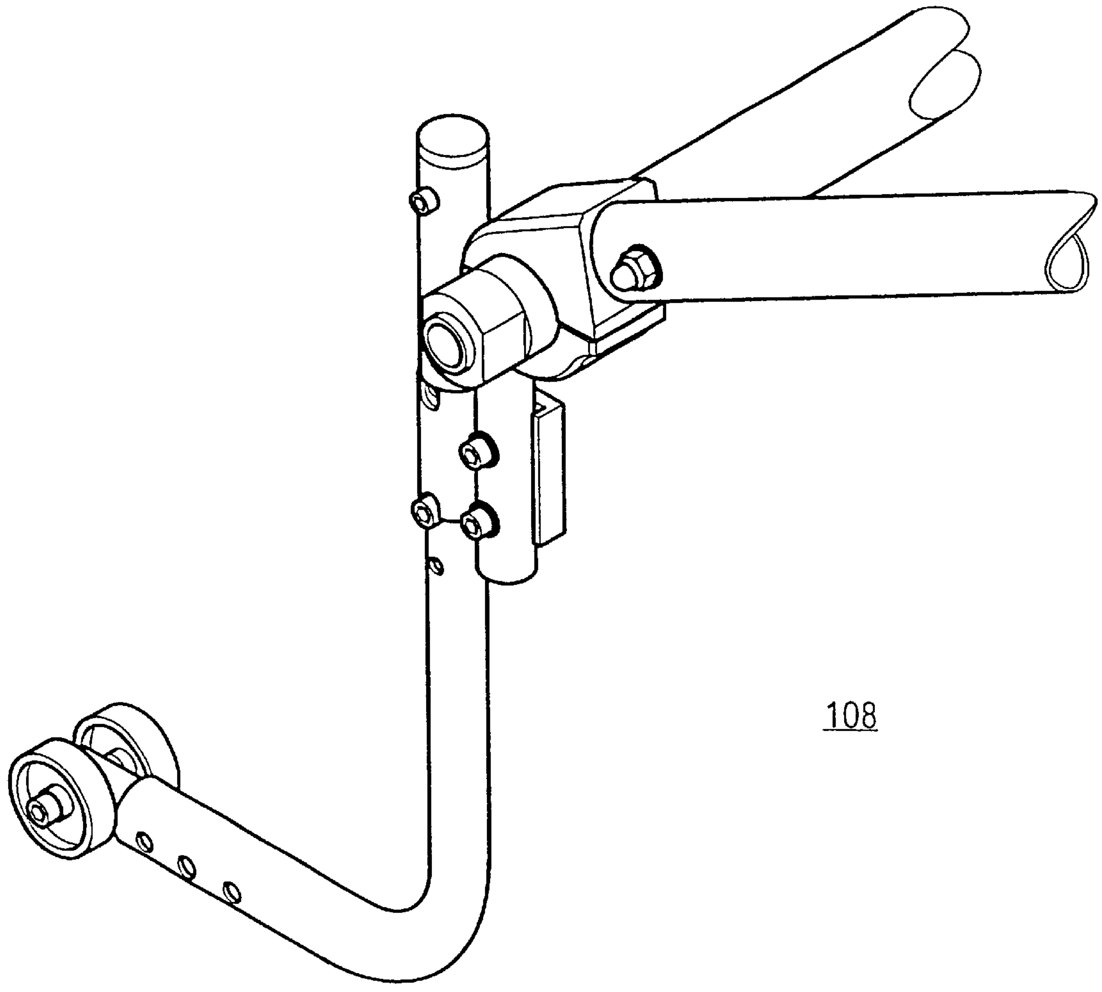
FIG. 16 is a graphic representation of a an anti-tilting device.

If necessary, the wheelchair 10 can be equipped with a transit roller device 106 in accordance with FIG. 15, and/or with an anti-tilting device 108 in accordance with FIG. 16.

FIG. 15 represents a transit roller device and FIG. 16 and anti-tilting device, which can be optionally installed on the wheelchair 10.

Figure 17:
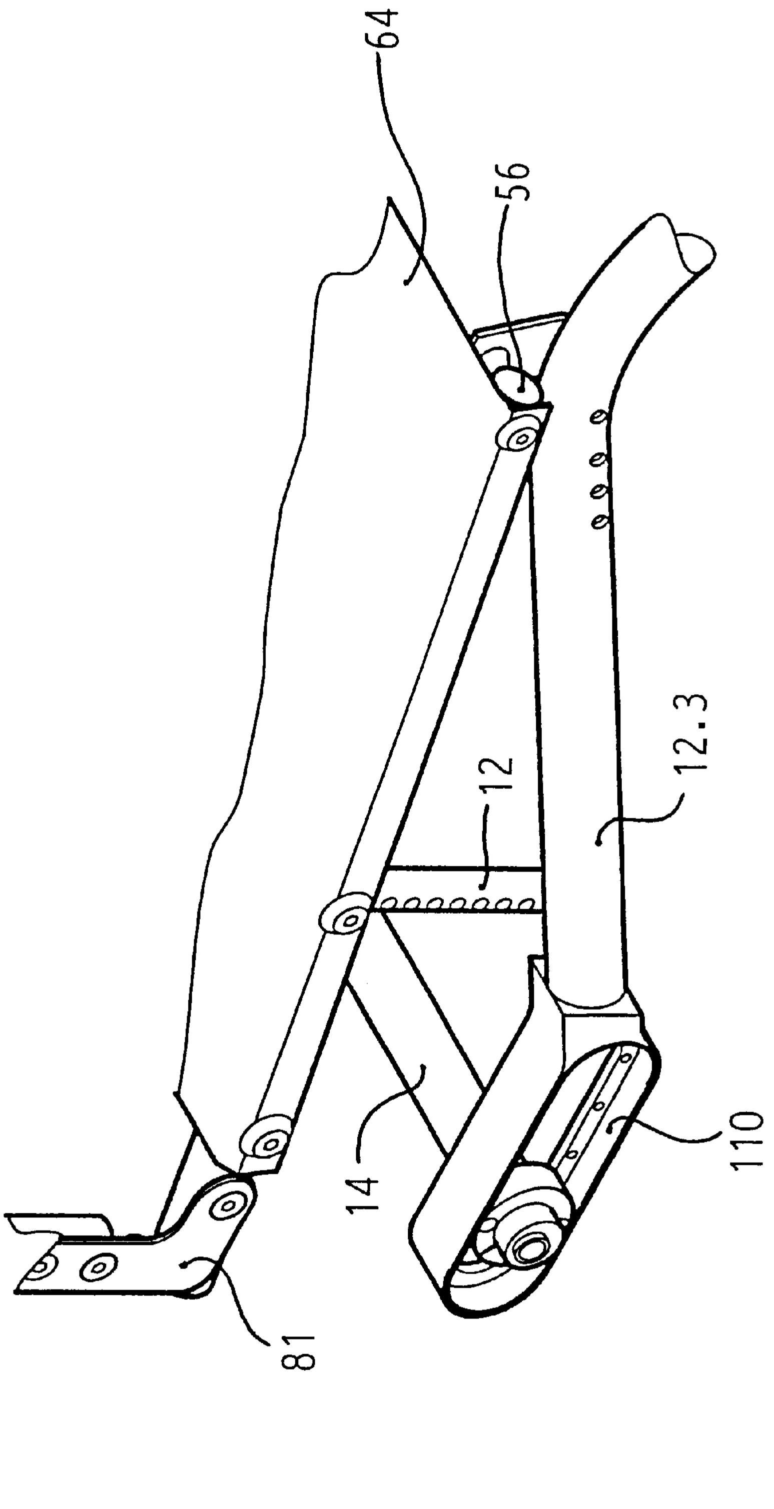
FIG. 17 represents a longitudinal support with an extension element for a wheelchair used in connection with a bike.

A longitudinal leg 12.3 with a longitudinal leg extension 110 is represented in FIG. 17. Such an embodiment of the frame is selected in order to be able to vary the wheel base, i.e. the mutual spacing between the rear wheels 18, on the one hand, and the front wheels 24, on the other, for example for users whose legs have been amputated, or for being able to use the wheelchair 10 temporarily in connection with a bike.

What is claimed is:

1. A wheelchair with a closed three-dimensional strutless frame, said frame consisting of:

a transverse axle tube for a pair of rear wheels, two lateral portions extending forwardly from said axle tube, each said lateral portion being unitary and having the shape of a reverse letter L, said two lateral portions being arranged symmetrically with respect to the longitudinal central axis of the wheelchair, and each L-shaped lateral portion consisting essentially of a generally longitudinally extending upper leg and a generally vertically extending lower leg at the front of said wheelchair, said upper leg having a rear end connected to said axle tube and a front end, and said lower leg having an upper end connected to said front end of said upper leg and a bottom end, a lower transverse horizontal front portion at a height to support the user's feet having two side ends respectively connected to bottom ends of said lower legs of said lateral portions, and front wheel supports, each of which is attached on the lower leg of a respective one of said lateral portions.

2. The wheelchair in accordance with claim 1, wherein said transverse horizontal front portion and said two lateral portions having the shape of a reversed letter L are made of one piece.

3. The wheelchair in accordance with claim 1, wherein the front wheel supports are welded to the lateral supports.

4. The wheelchair in accordance with claim 1, charaterized in that the front wheel support is fastened height-adjustably.

5. The wheelchair in accordance with claim 1, wherein the front wheel support is directed toward the back.

6. The wheelchair in accordance with claim 1, wherein the front wheel support is directed toward the longitudinal center plane of the wheelchair.

7. The wheelchair in accordance with claim 1, wherein on both sides the front transverse support has a neck extending in the direction of the adjoining upright leg of the lateral support, by means of which is fastened, adjustable in height.

8. The wheelchair in accordance with claim 1, wherein a footrest is arranged on the front transverse support.

9. The wheelchair in accordance with claim 1, wherein the rear wheels are seated by means of plug axles in adjustable angle adapter sleeves, which are connected with the axle tube.

10. The wheelchair in accordance with claim 1, wherein each longitudinal leg of the lateral supports has a longitudinal leg extension on a back end, in which the rear transverse support can be mounted in different positions.

11. The wheelchair in accordance with claim 1, wherein the longitudinal legs of the lateral supports are inclined downwardly toward the rear and are connected without struts with the rear transverse support.

12. The wheelchair in accordance with claim 1, wherein it has a pair of lateral longitudinal seat supports, between which a seat surface extends, wherein the longitudinal seat supports are hinged with first ends on the longitudinal legs of the lateral supports, and with second ends are connected with the said longitudinal legs via seat struts of adjustable effective lengths.

13. The wheelchair in accordance with claim 12, wherein each seat strut is pivotably hinged on the associated longitudinal seat support and has several bores in the longitudinal direction for the selective reception of a screw, by means of which the seat strut is fastened to the longitudinal leg of the lateral support, wherein the seat struts are connected with each other by means of a transverse rod arrangement.

14. The wheelchair in accordance with claim 12, wherein the seat surface is formed on a seat, which is a part of a seat module, which is releasably fastened on the frame, wherein the seat has at least one transverse seat support, which connects the longitudinal seat supports.

15. The wheelchair in accordance with claim 14, wherein the seat module has a back, which is indirectly fastened via the seat on the longitudinal leg of the wheelchair, wherein the angle between the seat and the back is adjustable, and the back can be flipped down on the seat.

16. The wheelchair in accordance with claim 15, wherein the back has two lateral upright back supports, which are connected with each other by a belt arrangement, which is longitudinally adjustable, if desired.

17. The wheelchair in accordance with claim 14, wherein the seat module has a back cushion with a rear back cushion element, a front back cushion element intended to rest against the back of the user, and a back cushion flap fastened to the front back cushion element, which lies between the seat surface and a seat cushion arranged on the seat surface.

18. The wheelchair in accordance with claim 3, wherein the front wheel support is directed toward the back.

19. The wheelchair in accordance with claim 3, wherein the front wheel support is directed toward the longitudinal center plane of the wheelchair.

20. The wheelchair in accordance with claim 3, wherein on both sides the front transverse support has a neck extending in the direction of the adjoining upright leg of the lateral support, by means of which the front transverse support is fastened, adjustable in height.

21. The wheelchair in accordance with claim 3, wherein a footrest is arranged on the front transverse support.

22. The wheelchair in accordance with claim 1, characterized in that the front wheel support is rotatable around the upright leg of the lateral support.

* * * * *